March 15, 1955     E. J. PETRASEK ET AL     2,703,947
FISH LURE
Filed April 12, 1954

INVENTORS
Edward J. Petrasek,
William A. Petrasek,
BY Rudolph Petrasek and
Walter Rutkowski

ATTORNEYS

United States Patent Office 2,703,947
Patented Mar. 15, 1955

2,703,947
FISH LURE

Edward J. Petrasek and William A. Petrasek, Clifton, Rudolph Petrasek, Fairlawn, and Walter Rutkowski, Clifton, N. J.

Application April 12, 1954, Serial No. 422,342

2 Claims. (Cl. 43—42.39)

This invention relates to a novel artificial fish lure, more particularly a fish lure of the spoon type constructed to simulate a fish in form and action.

Constructions have been evolved in the past providing for fish luring equipment simulating the action of the food fish of the fishes fished for. The theory of employing such constructions is that the fishes fished for will make an attempt to chase and swallow this lure which appears to them to be typical of their food. As a result of this attempt to swallow the lure, the hook becomes embedded in the fish, resulting in their being caught. Difficulties are often encountered in using such lures in that on drawing them out of the water the loosely connected hook often turns at an angle to the spoon permitting the fish to escape. Another difficulty encountered as a result of the loosely connected hook is that on attempting to draw the lure over the edge of the boat the hook often engages the side of the boat, thus fouling the line. It has also been found in employing conventional lures of the aforementioned type that their thin construction, though adequate in calm waters for achieving the desired motion, becomes useless in rough water to achieve the simulated fish action, since it is so readily buffeted about. Further problems arise in employing conventional apparatus for shallow water trolling, since the conventionally loosely held hook becomes snagged in sea weed, flotsam or jetsam.

It is with the above cited problems in mind, problems which arise from unstable spoon bodies and loosely held hooks attached thereto that the present invention has been evolved.

It is accordingly a primary object of this invention to provide a novel fish attracting lure.

It is another object of this invention to provide a fish lure which in use simulates the appearance and motion of a fish.

A further object of this invention is to provide a fish lure having stability in both calm and rough waters.

A still further object of this invention is to provide a fish lure which may readily be drawn over the side of a boat.

Another object of this invention is to provide a fish lure which may readily be used in shallow water trolling.

These and other objects of the invention which will become apparent from the following disclosure and claims are achieved by means of a fish lure construction, comprising: a dished elongate spoon member, having the general configuration of a fish and having a plurality of hooks rigidly fastened to the tail end thereof and extending to one side of the spoon member, and an exchangeable elongated weight positioned at the center of gravity thereof to provide stability.

A preferred embodiment of such a construction is described in the following specification taken in conjunction with the drawing in which.

Figure 1:
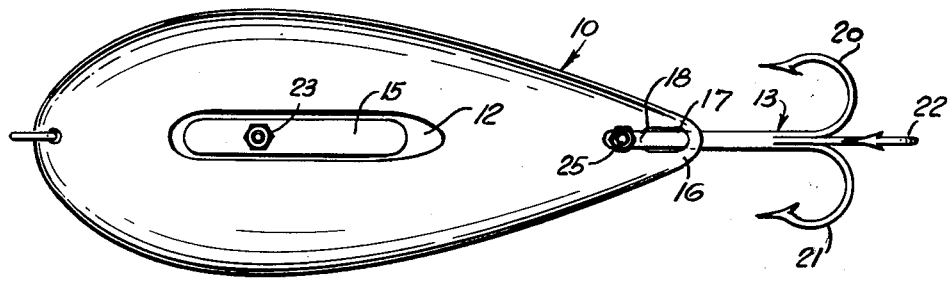
Figure 1 represents a top plan view of the fish lure of the present invention showing the weight and hook in position on the spoon member.
Figure 2:
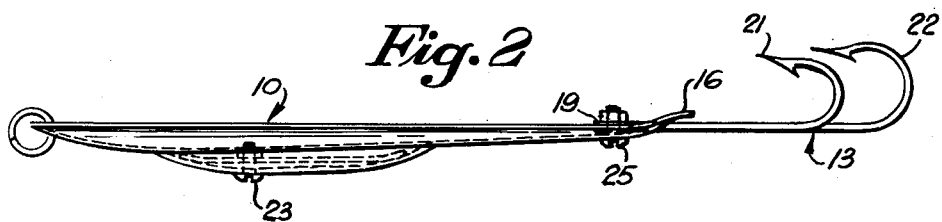
Figure 2 is a side elevation of the construction shown in Fig. 1.

Referring to the drawing where like parts have like numbers in the different figures, a dished spoon member 10 having a fish shape is formed of some shiny non-corrosive substance, such as sheet steel or plastic; the member 10 is essentially tear drop-shaped in outline and has upwardly raised edges. The tail end 16 of the spoon member is raised and has an opening 17 through which the shank portion 18 of hook 13 extends. The hook has an annular end 19 which is attached to the member 10 by means of a screw 25 extending through an opening provided in the member 10. It will be observed that the prongs 20, 21 and 22 of the hook (here shown as three but capable of variation from any number from one upwards) are all directed to lie on one side of the plane of the upper edge of the dished spoon member. The prongs 20 and 21 may extend at an angle of about 45° to the said plane, while the central perpendicular prong 22 is somewhat set back in relation to the prongs 20 and 21, as shown in Figure 2.

A weight 15 consisting of lead or the like is positioned in a depression 12. This depression has the outline of an elongated diamond and it lies on the center of gravity and along the axis of symmetry of the spoon member. This weight 15 is smaller in size than the depression 12 and is held in place by a screw 23 extending through an opening provided in the member 10. This weight provides a stability not heretofore achieved in fish lures of this type. The added weight though adding stability in no way detracts from the desired fish motion of the lure.

Figures 3, 4:
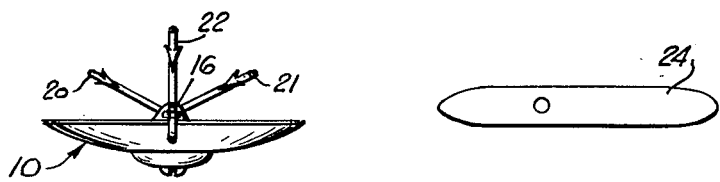
Figure 3 is a front elevation of the construction shown in Fig. 1 looking in the direction of arrows 3—3 of Fig. 1.
Figure 4 shows another weight member.

Figure 4 shows a larger weight 24 which may be used instead of the weight 15 and which will fill the depression 12 in its entirety. It is apparent that fishermen may use weights 15 and 24 interchangeably, the weight 15 being used for fishing in shallow waters while the weight 24 is used for deeper waters.

It should be obvious that variations in the specific type of hook employed, the specific shape of the weight, and the spoon may be employed without departing from the gist of the present invention.

It is apparent that the specific illustration shown and described has been given by way of illustration and not by way of limitation and that the structure above described is subject to wide variation and modification without departing from the scope or intent of the invention as defined in the appended claims.

What is claimed is:

1. A fish lure, comprising a concavo-convex spoon member which comprises slightly upwardly curved sides, said spoon member being substantially tear drop-shaped in outline and having a substantially rounded front end and an elongated tail end, said spoon member having an elongated depression formed therein and located centrally and symmetrically to the longitudinal axis thereof and including the center of gravity thereof, a readily removable elongated weight member located within said depression, a first screw connecting said weight member to said spoon, a hook member comprising a shank extending in a continuation of said longitudinal axis and having an end extending through an opening formed in said tail end, and at least one hook upon the other end of said shank, and a second screw connecting the first-mentioned end of said shank to said spoon, whereby said first screw facilitates associating the spoon member with weight members of different mass.

2. A fish lure, comprising a concavo-convex spoon member which comprises slightly upwardly curved sides, said spoon member being substantially tear-drop-shaped in outline and having a substantially rounded front end and an elongated tail end, said spoon member having an elongated depression formed therein and located centrally and symmetrically to the longitudinal axis thereof and including the center of gravity thereof, a readily removable elongated weight member located within said depression, a screw connecting said weight member to said spoon, and a hook member connected to said tail end, whereby said screw facilitates associating the spoon member with weight members of different mass.

References Cited in the file of this patent

UNITED STATES PATENTS

| Number | Name | Date |
|---|---|---|
| 1,661,688 | Bills | Mar. 6, 1928 |
| 2,088,775 | Davenport | Aug. 3, 1937 |
| 2,208,069 | Broz | July 16, 1940 |
| 2,238,292 | Schavey | Apr. 15, 1941 |
| 2,319,686 | Janisch | May 18, 1943 |
| 2,557,599 | Dunmire | June 19, 1951 |
| 2,605,574 | Rolf | Aug. 5, 1952 |